(12) United States Patent
Lunden et al.

(10) Patent No.: US 8,223,474 B2
(45) Date of Patent: Jul. 17, 2012

(54) APPARATUS FOR ELECTRIC POWER DISTRIBUTION

(75) Inventors: Arnstein Lunden, Skien (NO); Frode-Willy Jacobsen, Skien (NO); Gunn Kristin Sonsteby, Skien (NO); John-Anders Tveten, Porsgrunn (NO); John Rune West, Skien (NO); Lill-Bente Sandvik, Porsgrunn (NO); Oivind Naper, Skien (NO); Paal Kristian Skryten, Skien (NO); Richard Lauritzen, Skien (NO); Thor Endre, Skien (NO)

(73) Assignee: ABB Technology AG (CH)

( * ) Notice: Subject to any disclaimer, the term of this patent is extended or adjusted under 35 U.S.C. 154(b) by 0 days.

(21) Appl. No.: 13/158,096

(22) Filed: Jun. 10, 2011

(65) Prior Publication Data
US 2011/0304957 A1    Dec. 15, 2011

(30) Foreign Application Priority Data

Jun. 10, 2010 (EP) .................... 10165580

(51) Int. Cl.
*H02B 1/26* (2006.01)
*H02B 1/01* (2006.01)
*H02B 1/04* (2006.01)

(52) U.S. Cl. ........ 361/622; 361/623; 361/626; 361/627; 361/628

(58) Field of Classification Search .......... None
See application file for complete search history.

(56) References Cited

U.S. PATENT DOCUMENTS

| 2,128,149 | A | * | 8/1938 | Linde | 361/607 |
|---|---|---|---|---|---|
| 2,533,645 | A | * | 12/1950 | Volgovskoy | 361/609 |
| 4,395,602 | A | * | 7/1983 | Castonguay | 200/50.22 |
| 4,689,716 | A | | 8/1987 | Cooper et al. | |
| 5,181,158 | A | | 1/1993 | Goe, Jr. et al. | |
| 5,181,164 | A | * | 1/1993 | Beard et al. | 361/617 |
| 5,654,871 | A | * | 8/1997 | Wentler et al. | 361/622 |
| 6,452,810 | B1 | * | 9/2002 | Wilcox | 361/796 |
| 7,329,813 | B2 | | 2/2008 | Josten et al. | |
| 2002/0071261 | A1 | | 6/2002 | Wilcox | |
| 2009/0095610 | A1 | | 4/2009 | Mikkelsen et al. | |
| 2009/0267466 | A1 | | 10/2009 | Zook et al. | |

FOREIGN PATENT DOCUMENTS

DE    3337977 A1    5/1985

OTHER PUBLICATIONS

European Search Report; Application No. EP 10 16 5580; Issued: Sep. 13, 2010; 4 pages.

* cited by examiner

*Primary Examiner* — Boris Chervinsky
(74) *Attorney, Agent, or Firm* — St. Onge Steward Johnston & Reens LLC

(57) ABSTRACT

An apparatus, such as a metering panel, for electric power distribution. An enclosure having an access opening defining an interior space, at least two electrical components for separate phases of electricity. The two components located within the enclosure and spaced laterally apart, at least one electrically insulating barrier panel, movable between at least two guided positions, a working position within the enclosure and between the components and an access position displaced from the components.

15 Claims, 6 Drawing Sheets

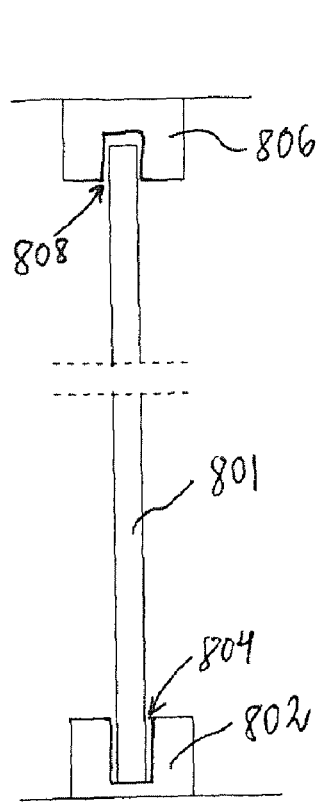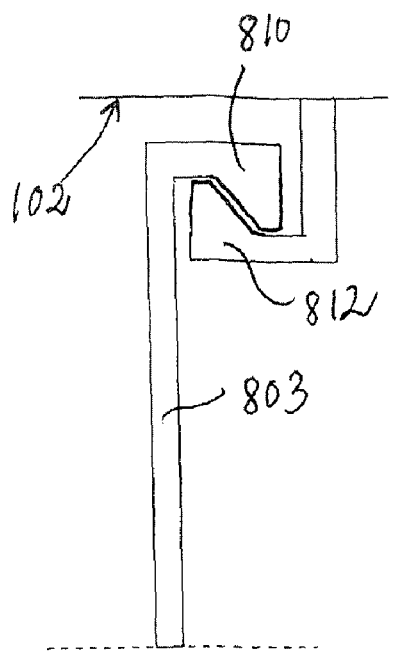
Fig. 8  Fig. 9
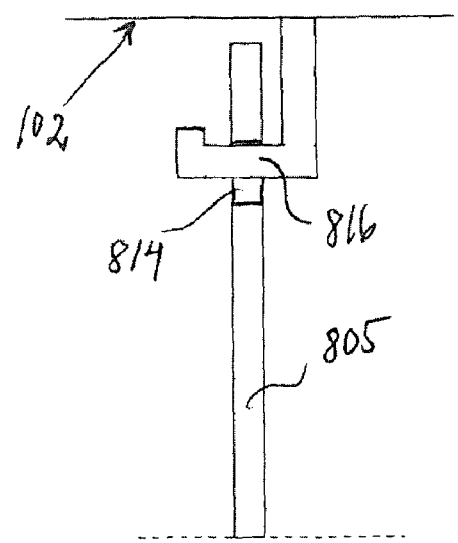
Fig. 10

APPARATUS FOR ELECTRIC POWER DISTRIBUTION

CROSS-REFERENCE TO RELATED APPLICATIONS

The present application claims priority of European patent application No. 10165580.1 filed on Jun. 10, 2010, the content of which is incorporated herein by reference.

FIELD OF THE INVENTION

The present invention relates to an apparatus for electric power distribution, comprising an enclosure having an access opening and defining an interior space, at least two electrical components for separate phases of electricity within the apparatus, the two components being located within the enclosure and being spaced laterally from one another, at least one barrier panel formed of an electrically insulating material, the barrier panel being movable in relation to the enclosure between at least two positions, and guiding means for guiding the barrier panel between the at least two positions. The guiding means are adapted to guide the barrier panel to a working position in which the barrier panel is located within the enclosure and between the components and is adapted to provide a barrier between the components. Further, the present invention relates to a metering panel comprising an apparatus of the above-mentioned sort.

BACKGROUND OF THE INVENTION

In the field of electric power distribution, electrical equipment may be enclosed by an enclosure, e.g. a cabinet or encapsulation made of metal, at some location, in order to protect or separate the electrical equipment from the surrounding environment or to protect the surrounding environment, including e.g. an operator or workman, or other individuals, from the electrical equipment, e.g. to prevent inadvertent contact between an operator or workman and the electrical equipment. The electrical equipment may comprise a switchgear or a metering panel etc, and is generally a multi-phase equipment, i.e. the equipment controls two or three phases of electricity. A multi-phase equipment enclosure may also include insulation systems to insulate the phases of electricity from one another to prevent arc faults.

U.S. Pat. No. 7,329,813 discloses a modular insulation system for an electrical equipment enclosure having multi-phase vertical bus bars. The insulation system comprises isolation barriers made of thermoplastic material. An inner isolation barrier is configured to isolate at least two of the vertical bus bars.

U.S. Pat. No. 4,689,716 describes a modular barrier assembly for use in a high voltage cabinet. The barrier assembly has vertical insulating partitions and is provided to slide into or out of the cabinet.

US-A1-2002/0071261 discloses a sliding barrier assembly for an electrical enclosure for selectively providing or prohibiting access to an electrical bus behind the barrier. The barrier assembly has two panels which are slidable between three positions. Two positions provide access to the bus and one position prohibits access to the bus.

US-A1-2009/0095610 describes a high voltage switchgear and maintenance thereof. Screening plates, e.g. made of PVC, are positioned between phases to shield/insulate phases from each other. The screening plates are inserted by means of an insulated claw rod.

US-A1-2009/0267466 discloses an enclosure for electric power meters including a slidable shelf adapted for supporting at least one transformer. The shelf is moved between a first position within the enclosure and a second position at least partially outside the enclosure.

U.S. Pat. No. 5,181,158 describes dielectric phase barriers in a multiple-phase distribution apparatus having an enclosure for separating the phases of electricity within the apparatus from one another in order to prevent physical contact and electrical communication between the phases. The barrier is manually placed in a working position within the enclosure and manually lifted from the working position.

The inventors of the present invention have identified a request for more compact electrical equipment housed in enclosures, especially more compact metering panels, in order to take up less space when installed on site.

The object of the present invention is thus to provide an electrical equipment enclosure, especially a metering panel, which is compact and non-bulky and thus requires less space when installed.

SUMMARY OF THE INVENTION

The above-mentioned object of the present invention is attained by providing an apparatus an apparatus for electric power distribution, comprising an enclosure having an access opening and defining an interior space, at least two electrical components for separate phases of electricity within the apparatus, the two components being located within the enclosure and being spaced laterally from one another, at least one barrier panel formed of an electrically insulating material, the barrier panel being movable in relation to the enclosure between at least two positions, and guiding means for guiding the barrier panel between the at least two positions, the guiding means being adapted to guide the barrier panel to a working position in which the barrier panel is located within the enclosure and between the components and is adapted to provide a barrier between the components, wherein the guiding means are adapted to guide the barrier panel to an access position in which the barrier panel is located within the enclosure and displaced from the components in relation to the working position of the barrier panel, and the barrier panel is adapted to provide access to the at least two components when the barrier panel is positioned in the access position.

The inventors of the present invention have identified the request for more compact electrical equipment enclosures, especially more compact metering panels, in order to take up less space when installed on site. A way to make e.g. a metering panel more compact, is to place the equipment of separate phases of electricity closer to one another. To reduce the distances between the phases of electricity within the enclosure without increasing the risk of arc faults, flash-over or electrical discharges between the phases of electricity, the inventors found the use of electrically insulating barriers between the phases of electricity to be advantageous. However, the inventors found that such barriers may prevent the access to electrical components during maintenance work, even if they would be movable, and when being movable, such barriers may be difficult to move or remove during maintenance work, resulting in a troublesome maintenance work.

By the present invention, the movable barrier panel is always kept within the enclosure, both in the access position and in the working position. The access position may be called service position, and the working position may be called in-operation position when the apparatus is in operation and carry voltage/current. Thus, the dimensions of the apparatus can be reduced and the apparatus takes up less space when installed on site, since any space outside the enclosure which is needed in prior art to receive a barrier penal when moved to its access position is no longer necessary. The apparatus can thus be placed in a narrow space. Thus, by the present invention, an electrical equipment enclosure, advantageously a metering panel, which is compact and non-bulky and thus requires less space when installed, is provided. The operation of the barrier panel is also facilitated as the barrier panel is always kept within the enclosure, resulting in a facilitated, secure and efficient maintenance work. By the present invention, the lateral extension of the apparatus is reduced, for example when the apparatus is electrically connected to busbars of an adjacent switchgear, since space for cable terminations are provided for inside the enclosure.

According to an advantageous embodiment of the apparatus according to the present invention, the apparatus is adapted for medium and/or high voltage, e.g. 1 kV and above, e.g. 36 kV, or 40.5 kV.

The dimensions of the barrier panel are sufficient to provide satisfactory insulation between the phases. The dimensions of the barrier panel depend on the design voltage, e.g. the rated voltage of the apparatus, the operational conditions of the apparatus, e.g. voltage level, the dimensions of the enclosing and the electrical components, and the material of the barrier panel.

The electrical component may comprise an electrical transmission component, an electrical transfer component, an electrical metering component, an electrically conducting component, a fuse, a connecting element, e.g. for connecting measuring equipment, a conductor, or other elements, which may have a structure or design, for e.g. un-insulated surfaces or edges, which causes or generates a problematic electric field and may give rise to an arc fault. The electrical components may be two components of separate phases located close to one another and therefore present an arc fault hazard.

The enclosure may be made of metal, or any other material. Generally, the enclosure may have three side walls, a top wall and a base. Two of the side walls, the top wall and the base may define the access opening. The access opening may also be defined by a separate frame affixed to the enclosure. The plane of such a frame may correspond to the plane of the access opening. The enclosure may be provided with an enclosure section, e.g. a door, for covering the access opening when the apparatus is in operation. The enclosure section may then be removed when a workman shall perform maintenance work. The enclosure section may be hinged to the enclosure, e.g. by hinges, or may be attached or mounted by other mounting means or elements. However, the enclosure may be designed in other ways.

By "to provide access to the at least two components" is meant that the two components are accessible to a workman, user or operator etc.

According to an advantageous embodiment of the apparatus according to the present invention, the guiding means are adapted to provide a gap between the components when the barrier panel is positioned in the access position, and the guiding means are adapted to position the barrier panel outside the gap when the barrier panel is positioned the access position. Hereby, an efficient access position is provided which gives the workman satisfactory access to the components, and the maintenance work is further facilitated.

According to a further advantageous embodiment of the apparatus according to the present invention, the apparatus comprises at least two barrier panels, each barrier panel being movable in relation to the at least one other barrier panel, and the guiding means are adapted to guide each barrier panel in relation to the at least one other barrier panel. If there are three phases of electricity within the apparatus, there are two gaps between the phases of electricity, and, advantageously, the apparatus then comprises two barrier panels, one barrier panel positioned in each gap when in the working position. By this embodiment, the barrier panels may be moved individually, which may facilitate the maintenance work at some occasions. If a first barrier panel is moved to the access position whereas the second barrier panel is kept in the working position, the workman may not be able to access all electrical components, as the second barrier panel may still block the workman's access to one of the components. However, it the blocked component is in operation, inadvertent contact between the workman and the component of the phase in operation is prevented. Alternatively, the guiding means may be configured to move the two barrier panels simultaneously. The barrier panels may for example be connected to one another by intermediate elements.

According to another advantageous embodiment of the apparatus according to the present invention, the apparatus comprises an outer panel which is movable in relation to the enclosure between at least two positions, where the outer panel is movable in a plane having all electrical components on one side and the access opening on the other side, the guiding means are adapted to guide the outer panel to a working position in which the outer panel is located within the enclosure and adapted to prevent access to all components, the guiding means are adapted to guide the outer panel to an access position in which the outer panel is located within the enclosure and displaced from the components in relation to the working position of the outer panel, and the outer panel is adapted to provide access to all components when the outer panel is positioned in the access position. By the outer panel, a workman can open the access opening of the enclosure and perform a visual inspection without risking any inadvertent contact with any of the components.

According to yet another advantageous embodiment of the apparatus according to the present invention, the outer panel is movable in relation to the at least one barrier panel, and the guiding means are adapted to guide the outer panel in relation to the at least one barrier panel. By this embodiment, the outer panel may be moved individually, which may facilitate the maintenance work. Alternatively, the guiding means may be configured to move the outer panel and the at least one barrier panel simultaneously. The outer panel may for example be connected to the at least one barrier panel by intermediate elements.

The guiding means may be designed in various ways. The guiding means may comprise first guiding means and second guiding means which are adapted to engage one another and adapted to move in relation to one another. The guiding means may comprise a guide adapted to guide the panel.

The guiding means may be configured to suspend the panel and may be provided in the region of an upper edge of the panel. The guiding means may comprise one or a plurality of guiding members, e.g. pins, rolls, wheels, blocks, bolts, hooks, or projections of the panel per se etc., affixed to the panel and an elongated groove or channel for each panel or an element provided with the groove, the guiding members being adapted to engage the groove and being movable in relation to the groove. Alternatively, the panel may be provided with the groove and the guiding members may be affixed to the enclosure. The guiding means may comprise an elongated guiding element having a top side and being provided with an elongated groove for each panel, the panel being adapted to engage the groove, and one or a plurality of guiding members affixed to the panel at an upper edge of the panel and adapted to move in relation to the guiding element and to slide or roll on the top side of the guiding element. One guiding element may be provided with one or a plurality of the grooves. Each panel may be associated with its own guiding element, or the guiding element may be adapted to guide a plurality of panels.

The guiding means may be provided at a lower edge of the panel and may comprise an elongated groove for each panel or an elongated guiding element provided with the elongated groove, and the groove or guiding element may be affixed to the enclosure, or the panel is movable in relation to the groove or the guiding element, and the panel per se may be adapted to engage the groove and is movable in relation to the groove and the guiding element, respectively. The panel by be provided with means for facilitating the sliding in the groove, e.g. means for decreasing the friction between the panel and the groove. Alternatively, one or a plurality of guiding members, e.g. of the above-mentioned sort, may be affixed to the panel at the lower edge of the panel and engage the groove, the guiding member being movable in relation to the groove. Alternatively, the panel may have an elongated groove and the guiding members may be affixed to the enclosure close to the lower side of the panel.

Instead of being located at an upper edge or a lower edge of the panel, the guiding means may be provided at other positions. In the detailed description, some aspects of the guiding means are illustrated, but other guiding means are also possible. The guiding means may be provided both at an upper edge and a lower edge of the panel.

The guiding means may comprise one or a plurality of hinges for pivoting the panel between the working and access positions.

According to still another advantageous embodiment of the apparatus according to the present invention, the panel is slidable in relation to the enclosure between the working and access positions, and the guiding means are adapted to guide the sliding of the panel in a plane of sliding. Having a sliding panel further facilitates the operation of the barrier panel and provides for that the barrier panel is always kept within the enclosure in an efficient way, resulting in an even more compact apparatus and a further facilitated, secure and efficient maintenance work. The guiding means for guiding the sliding of the panel may be designed in various ways, for example in ways already mentioned above.

According to a further advantageous embodiment of the apparatus according to the present invention, the guiding means comprise for each panel at least one longitudinal guiding device extending in the direction of sliding of the panel and comprising complementary guiding means arranged to slide in relation to one another. First guiding means of the complementary guiding means may comprise a channel or a groove and second guiding means of the complementary guiding means may comprise at least one projecting element which may engage the groove or channel. First guiding means of the complementary guiding means may comprise a surface and second guiding means of the complementary guiding means may comprise at least one member supported by said surface.

According to an advantageous embodiment of the apparatus according to the present invention, the plane of sliding of the panel is substantially parallel to the plane of the access opening. By this embodiment, an efficient control and guiding of the panel is provided and the accessibility of the components when the panel is in the access position and the insulating effect of the barrier panel, i.e. the barrier panel's insulation between the components, when the barrier panel is in the working position are further improved.

According to a further advantageous embodiment of the apparatus according to the present invention, the extension of the panel in the direction of sliding of the panel is smaller than the extension of the access opening in the same direction. By this embodiment, an efficient accessibility of the components when the panel is in the access position and an efficient insulating effect of the barrier panel when the barrier panel is in the working position are provided.

According to another advantageous embodiment of the apparatus according to the present invention, the apparatus comprises support means adapted to support the enclosure on a resting surface on which the support means are adapted to rest, and the plane of sliding of the panel is substantially transverse to the resting surface. By this embodiment, an efficient control and guiding of the panel is provided.

According to yet another advantageous embodiment of the apparatus according to the present invention, the enclosure comprises at least two side walls opposite one another, the plane of each side wall being substantially transverse to the resting surface, each side wall has a lower portion adapted to be adjacent to the resting surface and an upper portion opposite the lower portion, and the guiding means are located in the region of the upper portion of the side walls and above the at least two electrical components. By this embodiment, an efficient control and guiding of the panel is provided. Alternatively, the guiding means are located in the region of a lower portion of the side walls and below the at least two electrical components. Alternatively, the guiding means are located in the region of both the lower portion and the upper portion of the side walls. However, other locations are possible.

According to still another advantageous embodiment of the apparatus according to the present invention, the panel is transparent. By this embodiment, the maintenance work is further facilitated and made more secure, as the workman may see through the panel and may thus inspect the components without moving the panel to the access position, and may inspect components without disconnecting the power supply. For example, damaged regions, discoloured regions, which may indicate that flash-over took place, or dust on the equipment may be observed through the transparent panel.

According to an advantageous embodiment of the apparatus according to the present invention, the panel is made of a polymer-containing material. By using a polymer-containing material, e.g. plastic, a robust, low-weight, flexible and non-expensive panel is provided. The material of the panel may comprise a composite. The material of the panel may be comprise glass reinforced polyester, one or a plurality of thermoplastic or thermosetting polymers, polycarbonate etc. However, other electrically insulating materials are also possible, e.g. glass, porcelain materials etc.

According to a further advantageous embodiment of the apparatus according to the present invention, the apparatus comprises locking means for locking the panel in the working position. By locking the panel in the working position, the safety of the workman is further improved, and any accidental movement of the panel from the working position to the access position is prevented.

According to another advantageous embodiment of the apparatus according to the present invention, the locking means comprise a first and a second locking means adapted to engage one another to lock the panel in the working position, the first locking means is affixed to the panel, and the panel is movable in relation to the second locking means. Advantageously, one of the first and second locking means comprises a recess and the other comprises a projection adapted to engage and disengage the recess. By these embodiments, efficient locking of the panel is provided, and any accidental movement of the panel from the working position to the access position is further prevented. The projection and recess may be designed in various ways. Locking means different from the recess and the projection are also possible.

Further, the above-mentioned object of the present invention is attained by providing a metering panel for medium and/or high voltage, the metering panel being connectable to an electric power distribution system, wherein the metering panel comprises an apparatus according to any of the claims 1 to 14 and/or any of the above-mentioned embodiments of the apparatus. Positive technical effects of the metering panel according to the present invention, and its embodiments, correspond to the above-mentioned technical effects mentioned in connection with the apparatus according to the present invention, and its embodiments.

According to an advantageous embodiment of the metering panel according to the present invention, each of the at least two electrical components comprises a fuse or a connecting element for connection of an earth probe, in order to ground the equipment. Advantageously, the metering panel comprises a metering device for measuring parameters of the electric power distribution within the apparatus.

According to another advantageous embodiment of the metering panel according to the present invention, where the apparatus has an enclosure having two opposite side walls, for each phase of electricity a Voltage Transformer is mounted to one of the side walls and within the enclosure, and a Current Transformer is mounted to the opposite side wall and within the enclosure. By the innovative barrier and/or outer panel of the present invention, flexibility is attained with regard to the entry of conductors, e.g. cables or busbars, and the mounting of the Voltage Transformers and Current Transformers. A conductor entering the enclosure to be connected to the Current Transformer may enter the enclosure from below or via any of the two opposite side walls, and the Current Transformer may be mounted to any of the side walls and the Voltage Transformer to the other. According to a further advantageous embodiment of the metering panel according to the present invention, for each phase of electricity the electrical component is located somewhere between the Voltage Transformer and the Current Transformer.

The above-mentioned features and embodiments of the apparatus and the metering panel, respectively, may be combined in various possible ways providing further advantageous embodiments.

Further advantageous embodiments of the apparatus and the metering panel according to the present invention emerge and further advantages with the present invention emerge from the detailed description of embodiments.

BRIEF DESCRIPTION OF THE DRAWINGS

The present invention will now be described, for exemplary purposes, in more detail by way of embodiments and with reference to the enclosed drawings, in which:

FIG. 8 illustrates schematically alternative embodiments of the guiding means;

FIG. 9 illustrates schematically further alternative embodiments of the guiding means; and FIG. 10 illustrates schematically further alternative embodiments of the guiding means.

DETAILED DESCRIPTION OF THE INVENTION

Figure 1:
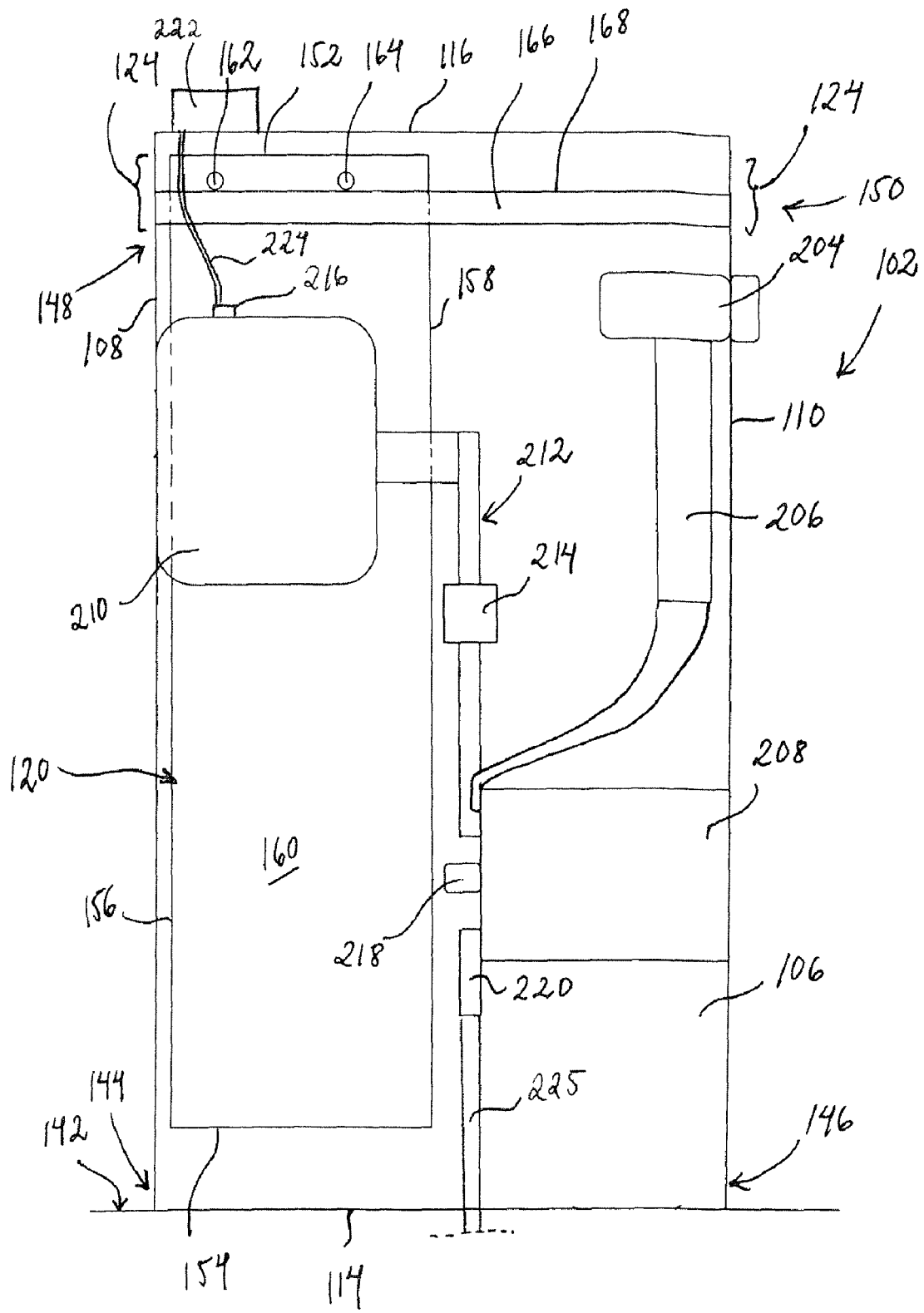
FIG. 1 is a schematic side view of an embodiment of the metering panel according to the present invention comprising an embodiment of the apparatus according to the present invention, when viewed into the access opening of the enclosure, illustrating a barrier panel in an access position.

FIGS. 1-4 shows schematically an embodiment of the metering panel connectable to an electric power distribution system according to the present invention, the metering panel comprising an embodiment of the apparatus according to the present invention, both adapted for medium and/or high voltage, e.g. 1 kV and above. The metering panel/apparatus comprising an enclosure 102 which has an access opening 104 (see FIG. 3) and defines an interior space 106. The enclosure 102 may be in the form of a cabinet. The enclosure 102 shown comprises a first side wall 108 and a second side wall 110 opposite one another and connected via a third side wall 112. The enclosure 102 further comprises a base 114 and a top wall 116. The base 114 may be in the form of a hollow frame or a solid section. The top wall 116 may also be replaced by a hollow frame, but a top wall is advantageous to protect the interior space 106 of the enclosure 102 from e.g. dust. The first and second side walls 108, 110, the base 114 and the top wall 116 define the access opening 104. The enclosure 102 may be provided with an enclosure section 118 in the form of a door 118 (see FIG. 4) to cover or close the access opening 104 when the metering panel is in operation to prevent access to the electrical equipment housed in the enclosure 102. The enclosure section 118 may be hinged to the enclosure 102, e.g. by hinges, or may be attached or mounted by other mounting means or elements. The enclosure 102 and its above-mentioned parts are generally made of metal but may be made of any other suitable material.

Figure 2:
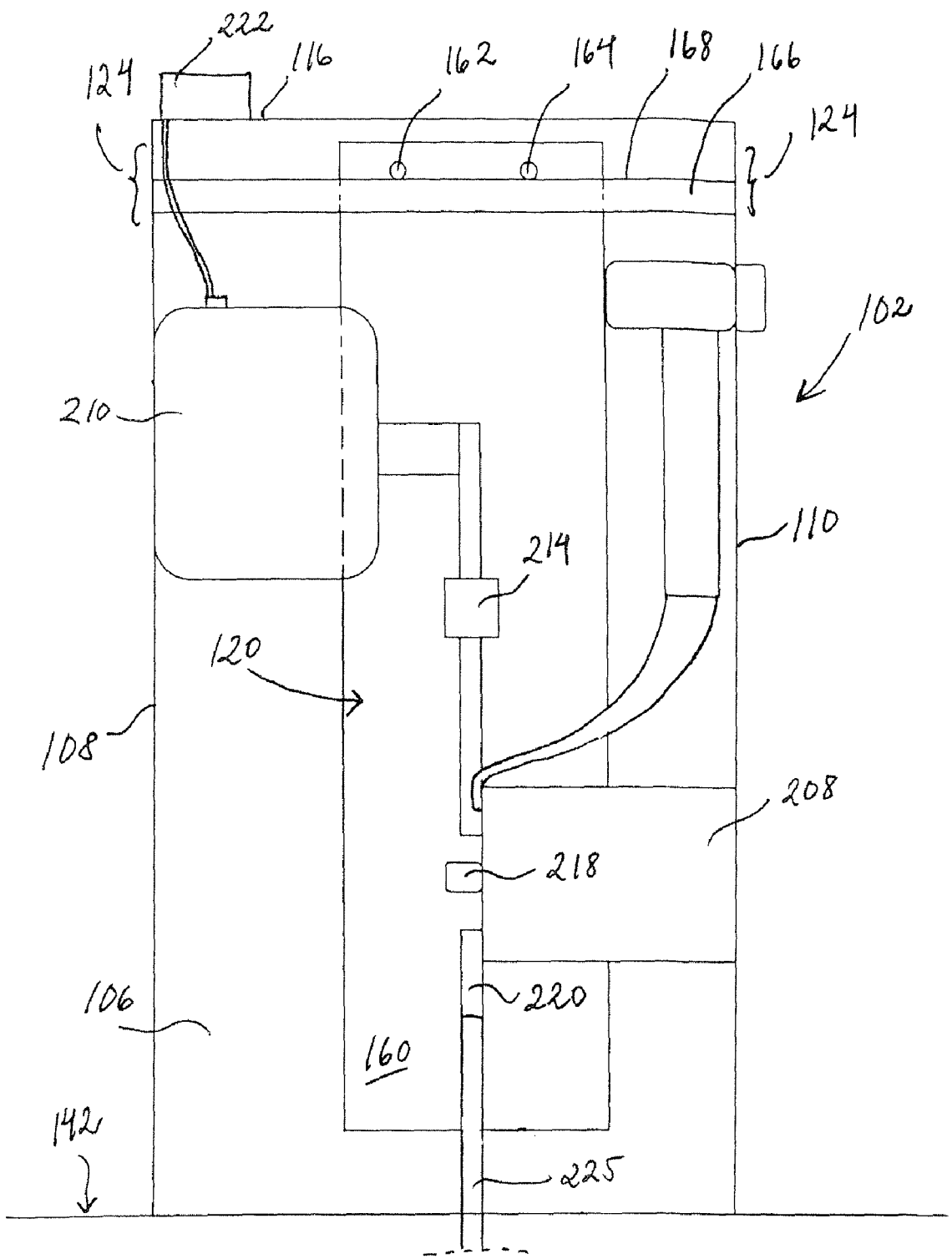
FIG. 2 is a schematic side of the metering panel of FIG. 1 illustrating a barrier panel in a working position.

In FIGS. 1 and 2, the metering panel is shown with the enclosure section 118 removed and when viewed into the access opening 104 (see FIG. 3) of the enclosure 102. The enclosure 102 houses three equipment groups 202, 302, 402 for separate phases of electricity, one equipment group for each phase. There are three phases of electricity in the embodiment shown. The equipment groups 202, 302, 402 are spaced laterally from one another. In FIGS. 1 and 2, only the equipment groups 202 closest to the access opening 104 is shown and the other equipment groups 302, 402 are positioned behind the equipment group 202 shown. With reference to FIGS. 1 and 2, each equipment group 202, 302, 402 comprises a first connection device 204, 304, 404 for electrical connection to a conductor, which may be in the form of a cable or a busbar (not shown), which at the other end may be connected to a switchgear which in turn may be connected to a switchgear to a load or to a medium or high voltage power distribution line. The first connection device 204, 304, 404 is mounted to the second side wall 110 and may be configured and insulated in ways known to the person skilled in the art.

The first connection device 204, 304, 404 is adapted to electrically connect the busbar or cable to an insulated first conductor 206, 306, 406 which is connected to a Current Transformer 208, 308, 408 which is mounted to the second side wall 110. The Current Transformer 208, 308, 408 is electrically connected to a Voltage Transformer 210, 310, 410 via a connection unit 212, 312, 412 including a first electrical component 214, 314, 414 in the form of a fuse 214, 314, 414. The Voltage Transformer 210, 310, 410 is mounted to the first side wall 108. The Current Transformer 208, 308, 408 and the Voltage Transformer 210, 310, 410 are located within the enclosure 102. Alternatively, the Voltage Transformer 210, 310, 410 may be mounted to the second side wall 110, and the Current Transformer 208, 308, 408 may be mounted to the second side wall 110. Current Transformers and Voltage Transformers are devices known to the skilled person and are therefore not discussed in more detail. The Voltage Transformer 210, 310, 410 is electrically connected to a second connection device 216, 316, 416 for connection of measuring equipment 222 to the Voltage Transformer 210 via a second conductor 224, e.g. a low voltage cable. The measuring equipment 222 may located outside of the enclosure 102 and is adapted to measure parameters of the power or current transmitted via the metering panel. The measuring equipment 222 may be connected to display means, e.g. one or a plurality of metering displays, in ways known to the skilled person, to display measured parameters. Each equipment group 202, 302, 402 also comprises a second electrical component 218 in the form of a first connecting element 218 for connection of an earth probe during maintenance work, the first connecting element 218 being electrically connected and mounted to the Current Transformer 208. Each equipment group 202, 302, 402 comprises a third electrical component 220 in the form of a second connecting element 220 for connection of the Current Transformer 208, and the metering panel, to an electrical distribution system, e.g. in the form of a building or a small industry etc, via a third conductor 225. Thus, the main current path through the metering panel enters the enclosure 102 at the first connection device 204 and exits the enclosure 102 via the third conductor 225. In this embodiment, the third conductor 225 exits the enclosure 102 via the base 114 of the enclosure 102, and the first connection device 204 is provided at the second side wall 110. However, other locations of the first connection device 204 and other exit locations of the third conductor 225 are possible, and the first connection device 204 and third conductor 225 may have various designs. The connection unit 212, 312, 412, and parts thereof, and the connection of the first conductor 206, 306, 406 to the Current Transformer 208, 308, 408, and other elements, may also form an electrical component as defined in the appended claim 1. The above-mentioned electrical components are located within the enclosure 102, and corresponding electrical components for the separate phases of electricity are spaced laterally from one another. The apparatus and each equipment group 202, 302, 402 may comprise additional electrical devices known to the skilled person.

Two barrier panels 120, 122 formed of an electrically insulating material, which may be transparent, are housed within the enclosure 102 and movable in relation to the enclosure 102 between at least two positions. Guiding means 124 are provided for guiding each barrier panel 120, 122 between the at least two positions.

Figure 4:
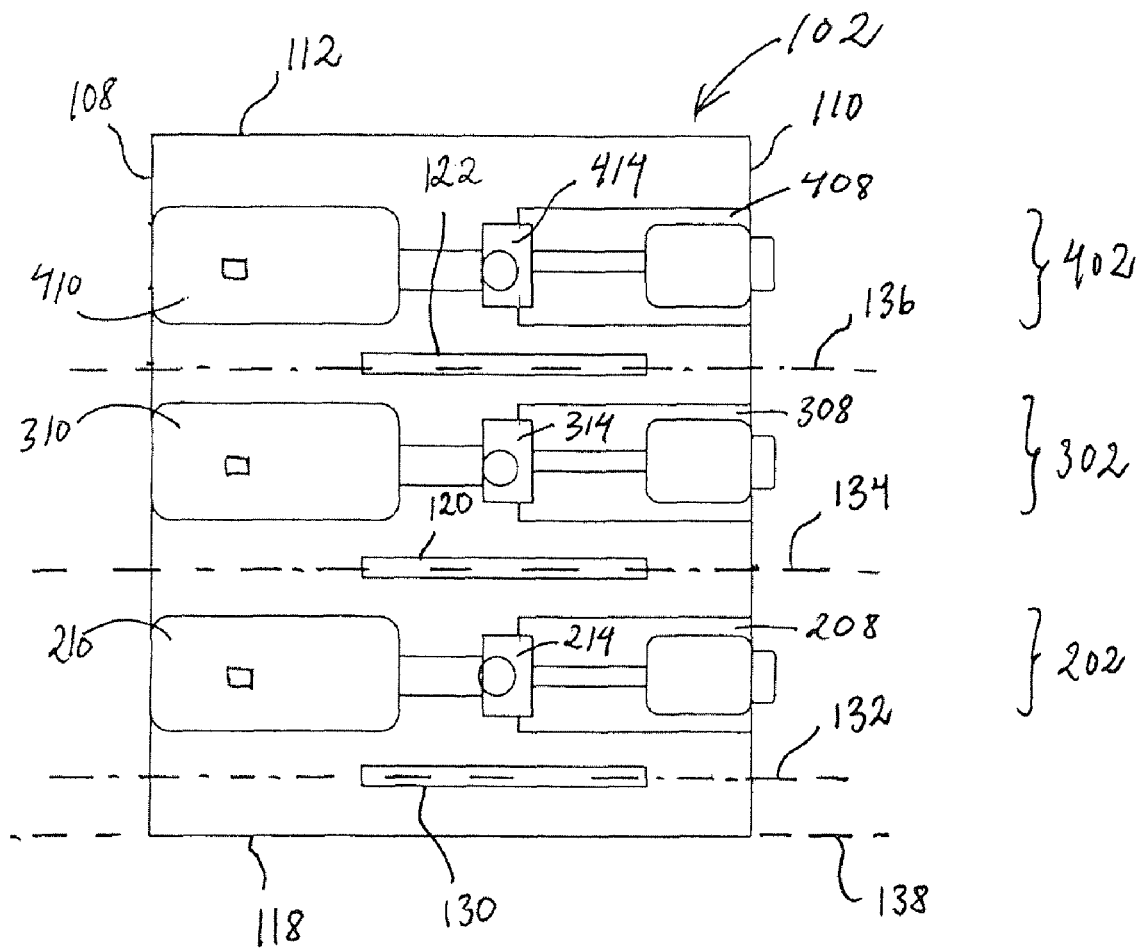
FIG. 4 is a top view of the metering panel as shown in FIG. 2.

The guiding means 124 are adapted to guide the barrier panel 120, 122 to a working position in which the barrier panel 120, 122 is located within the enclosure 102 and between the equipment groups 202, 302, 402, and thus also between the first electrical components 214, 314, 414, between the second electrical components 218 and the third electrical components 220, to provide an electrical barrier, or shield, between the components of separate phases and prevent electrical communication between the phases. In FIGS. 1 and 2, only the barrier panel 120 between the equipment group 202 and the equipment group 302 is shown. When the metering panel is in operation, the barrier panels 120, 122 should be in the working position. The working position of the barrier panels 120, 122 is shown in FIGS. 2 and 4. The dimensions of each barrier panel 120, 122 are sufficient to provide satisfactory insulation between the phases, and depend on the operation conditions of the metering panel, e.g. voltage level, the dimensions of the enclosing and the electrical components, and the material of the barrier panel etc.

Figure 3:
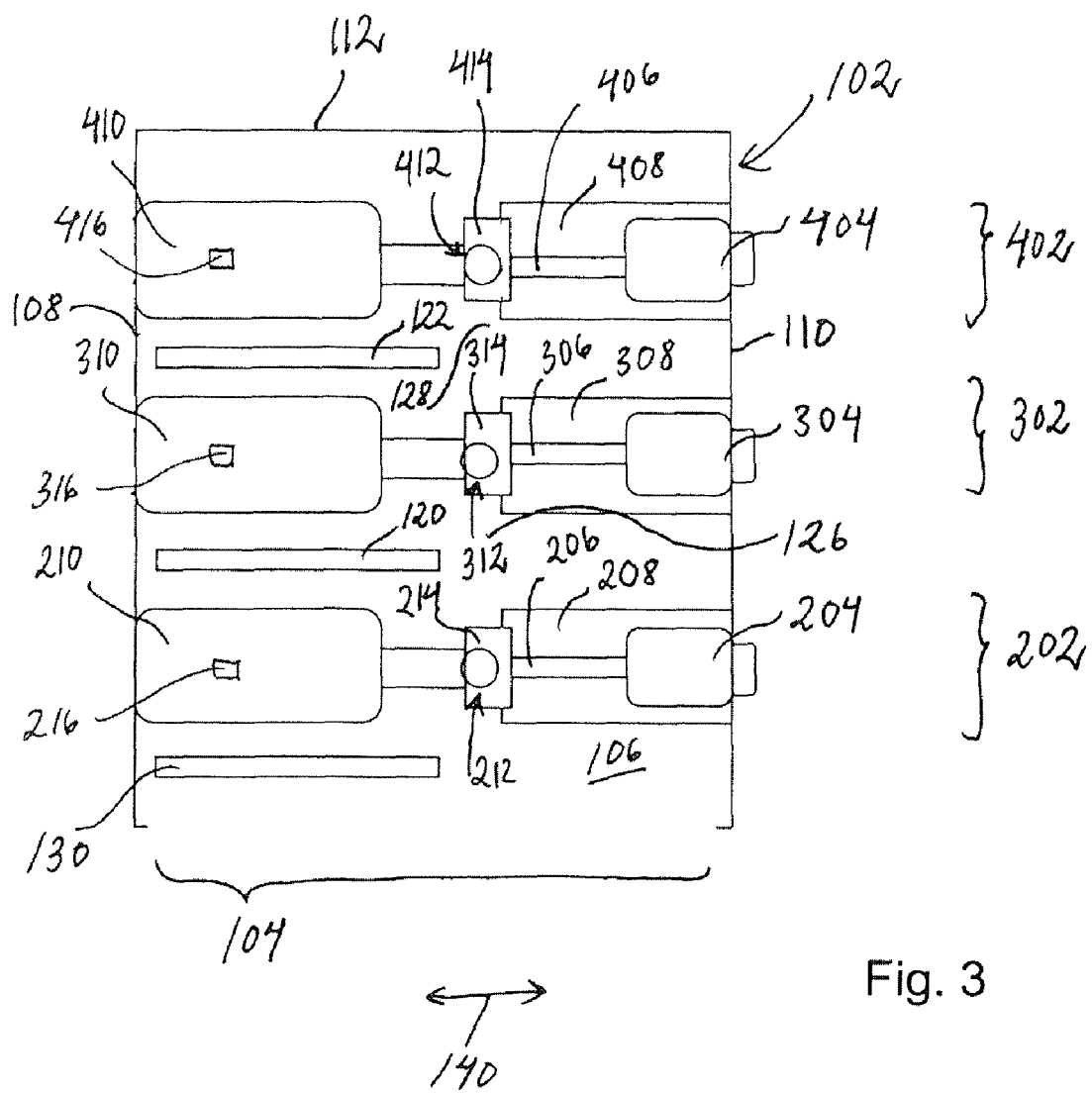
FIG. 3 is a top view of the metering panel as shown in FIG. 1.

The guiding means 124 are adapted to guide the barrier panel 120, 122 to an access position in which the barrier panel 120, 122 is located within the enclosure 120 and displaced from the components 214, 314, 414, 218, 220 in relation to the working position of the barrier panel 120, 122. The barrier panels 120, 122 are adapted to provide access to the components 214, 314, 414, 218, 220 via the access opening 104 when the barrier panels 120, 122 are positioned in the access position. The access position of the barrier panels 120, 122 are shown in FIGS. 1 and 3. When the barrier panels 120, 122 are in the access position, the metering panel should not be in operation and not carry any current or voltage. The guiding means 124 are adapted to provide a lateral gap 126, 128 between the components 214, 314, 414, 218, 220 when the barrier panel 120, 122 is positioned in the access position, and the guiding means 124 are adapted to position the barrier panel 120, 122 outside the lateral gap 126, 128 when the barrier panel 120, 122 is positioned the access position (see FIG. 3). In the embodiment shown, each barrier panel 120, 122 is movable in relation to the other barrier panel 120, 122, and the guiding means 124 are adapted to guide each barrier panel 120, 122 in relation to the other barrier panel 122.

Further, an outer panel 130 formed of an electrically insulating material, which may be transparent, is housed within the enclosure 102 and movable in relation to the enclosure 102 between at least two positions. The outer panel 130 is movable in a plane 132 (see FIG. 4) having all electrical components 214, 314, 414, 218, 220 on one side and the access opening 104 on the other side. The guiding means 124 are adapted to guide the outer panel 130 to a working position (see FIG. 4) in which the outer panel 130 is located within the enclosure 102 and adapted to prevent access to all components 214, 314, 414, 218, 220. The guiding means 124 are adapted to guide the outer panel 130 to an access position (see FIG. 3) in which the outer panel 130 is located within the enclosure 102 and displaced from the components 214, 314, 414, 218, 220 in relation to the working position of the outer panel 130. The outer panel 130 is adapted to provide access to all components 214, 314, 414, 218, 220 via the access opening 104 when the outer panel 130 is positioned in the access position, provided that the above-mentioned barrier panels 120, 122 are also in the access position. The outer panel 130 is movable in relation to the two barrier panels 120, 122, and the guiding means 124 are adapted to guide the outer panel 130 in relation to the barrier panels 120, 122.

Each panel 120, 122 130 is slidable in relation to the enclosure 102 between the working and access positions, and the guiding means are adapted to guide the sliding of the panel 120, 122 130 in a plane of sliding 134, 136, 132 (see FIG. 4). Each plane of sliding 134, 136, 132 is substantially parallel to the plane 138 of the access opening 104. The extension of each panel 120, 122 130 in the direction of sliding 140 of the panel 120, 122 130 is smaller than the extension of the access opening 104 in the same direction 140. Support means 114, in the form of the base 114 of the enclosure 102, is adapted to support the enclosure 102 on a resting surface 142 on which the base 114 is adapted to rest, and the plane of sliding 134, 136, 132 of each panel 120, 122 130 is substantially transverse to the resting surface 142. The plane of each side wall 108, 110, 112 is substantially transverse to the resting surface 142, and each side wall 108, 110, 112 has a lower portion 144, 146 adapted to be adjacent to the resting surface 142 and an upper portion 148, 150 opposite the lower portion 144, 146. The guiding means 124 are located in the region of the upper portion 148, 150 of the side walls 108, 110, 112 and above the components 214, 314, 414, 218, 220.

In the embodiment shown, each panel 120, 122 130 is rigid or substantially rigid and made of a polymer-containing material, e.g. polycarbonate. However, the panel 120, 122 130 may be made of other material as discussed above. Each panel 120, 122 130 is transparent to facilitate the maintenance work, as the workman may see through the panel 120, 122 130 and inspect the components 214, 314, 414, 218, 220 without moving the panel 120, 122 130 to the access position. Each panel 120 has an upper edge 152 and a lower edge 154 opposite the upper edge 152, the lower and upper edges 152, 154 being connected by two vertical edges 156, 158. The edges 152, 154, 156, 158 define two opposed surfaces 160 of the panel 120 (only one panel surface 160 shown in FIGS. 1-2).

Figure 5:
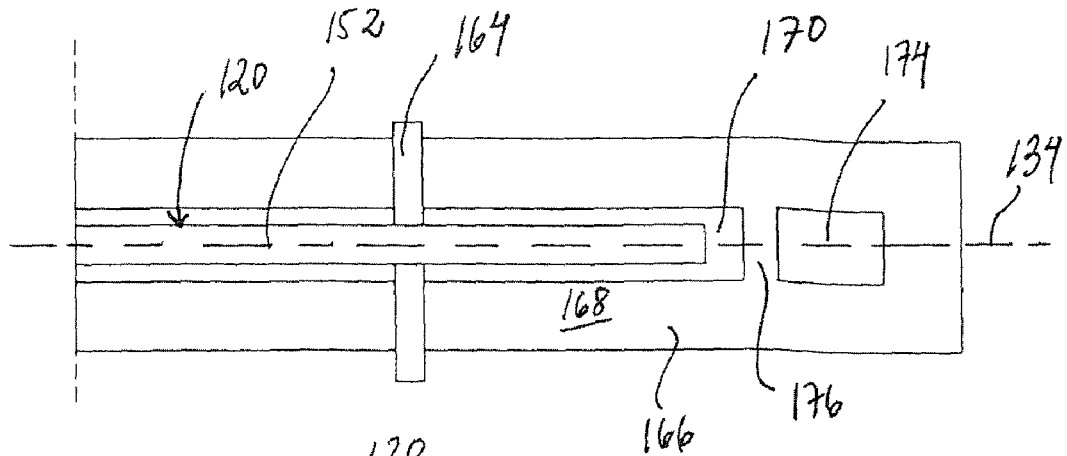
FIG. 5 is a schematic partial detail view of a first embodiment of the guiding means of the apparatus according to the present invention, seen from above.

With reference to FIGS. 1, 2 and 5, the guiding means 124 of the embodiment shown are now discussed in more detail. The guiding means 124 are configured to suspend the panel 120, 122 130 and are provided in the region of the upper edge 152 of the panel 120. For each panel 120, 122 130 the guiding means 124 comprise a plurality of guiding members 162, 164, two in the shown embodiment, in the form of elongated rolls or pins, affixed to the panel 120. The guiding members 162, 164 may be affixed to the panel 120 by being inserted into a mounting hole in the panel 120 at the upper edge 152 thereof, but the guiding members by be affixed in other ways and have other designs. For each panel 120, 122, 130 the guiding means 124 comprise an elongated guiding element 166 which has a top side 168 and is affixed to the enclosure 102 in the region of the upper portions 148, 150 of the side walls 108, 110, 112, for example by being attached to the top wall 116 or to the first and second side walls 108, 110. The guiding element 166 defines an elongated groove 170 extending in the direction of sliding of the panel 120. The panel 120 is adapted to engage the groove 170 and adapted to slide in the groove 170. The guiding members 162, 164 have a longitudinal extension which exceeds the transverse extension of the groove 170 and are adapted to slide or roll on the top side 168 of the guiding element 166. The transverse extension of the groove 170 is adapted to minimize any lateral movement of the panel 120. The panel 120 is movable in relation to the guiding element 166. However, as discussed above, and shown below in connection with FIGS. 8-10, several other designs of the guiding means are possible.

Figure 6:
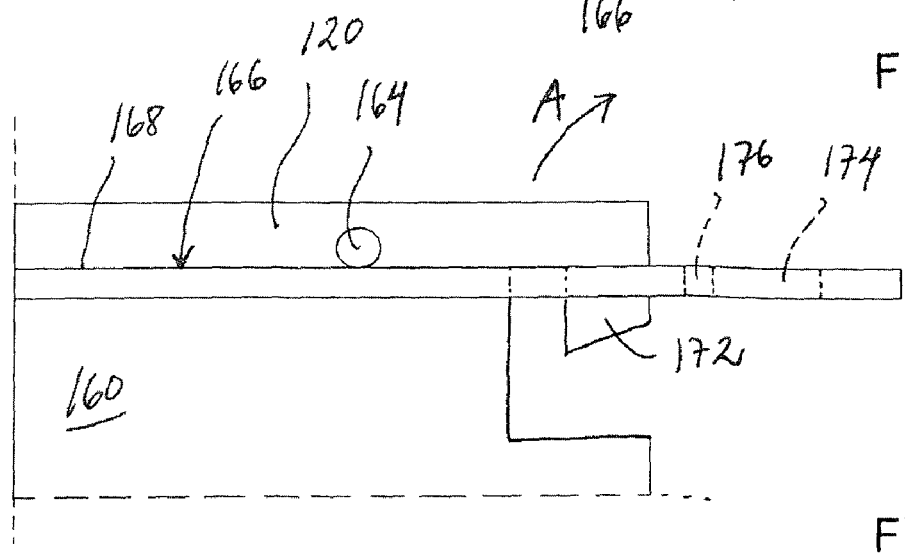
FIG. 6 is a schematic partial side view of the guiding means of FIG. 5.
Figure 7:
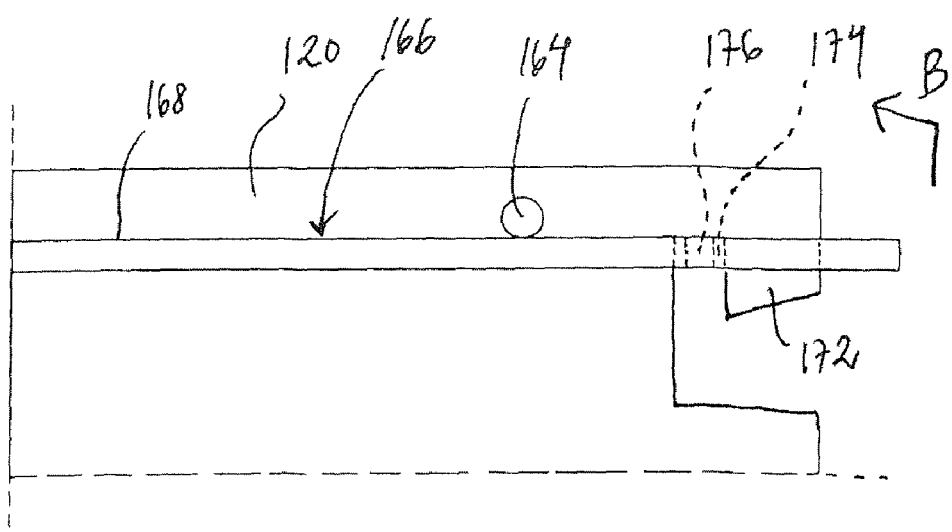
FIG. 7 is a schematic partial side view of the guiding means of FIG. 5 in another position.

With reference to FIGS. 5-7, the apparatus comprises locking means for locking the panel 120 in the working position. The locking means comprise a first locking means 172 in the form of a projection 172 affixed to the panel 120, for example by being integral with the panel 120, and second locking means 174 in the form of a recess or an opening 174 defined by the guiding element 166 and extending in the direction of sliding of the panel 120. The first locking means 172 is adapted to engage the second locking means 174 to lock the panel 120 in the working position. The panel 120 is movable in relation to the second locking means 174, and the second locking means is affixed to the panel 120. In FIG. 6, the projection 172 is outside of the opening 174, and the panel 120 and the locking means are thus in an un-locked position. In FIG. 7, the projection 172 engages the opening 174, and the panel 120 and the locking means are thus in a locked position and the panel 120 is locked in the working position, whereby the panel 120 cannot be slid in the direction of sliding. In order to move the panel 120 from the un-locked position to the locked position, the panel 120 is slightly elevated and pushed in the direction indicated by arrow A in FIG. 6 to allow the projection 172 to pass over the bridge 176 between the groove 170 and the opening 174, and the panels is then lowered whereupon the projection engages the opening 174. In order to move the panel 120 from the locked position to the un-locked position, the panel is 120 elevated and pushed in the direction as indicated by arrow B in FIG. 7. However, as discussed above, other designs of the locking means are possible.

With reference to FIGS. 8-10, which show panels 801 when viewed in the direction of sliding, alternative guiding means are illustrated. With reference to FIG. 8, alternative guiding means may comprise a lower element 802 defining a longitudinal groove 804 extending in the direction of sliding of the panel 801, and an upper element 806 defining a longitudinal groove 808 extending in the direction of sliding of the panel 801. The panel 801 is adapted to engage the grooves 804, 808 and slide in relation to the grooves and the elements 802, 806. According to another alternative guiding means, the upper element 806 may be excluded. The elements may have various shapes. In FIG. 9, further alternative guiding means are illustrated, provided at the upper edge of the panel 803 and comprising two complementary members 810, 812 engaging one another and being slidable in relation to each other, one 810 of the members 810, 812 being affixed to the panel 803, the other member 812 being affixed to the enclosure 102 of the apparatus. In FIG. 10, other alternative guiding means are illustrated, provided at the upper edge of the panel 805 and comprising an elongated groove 814 defined by the panel 805, the groove 814 extending in the direction of sliding of the panel 805, and one or a plurality of projections 816 engaging the groove 814 and being slidable in relation to the groove 814. Each projection 816 is affixed to the enclosure 102 of the apparatus. By the guiding means of FIGS. 9 and 10, the panel 803, 805 is suspended.

The invention shall not be considered limited to the embodiments illustrated, but can be modified and altered in many ways by one skilled in the art, without departing from the scope of the appended claims. The enclosure, the equipment therein and the guiding means may for example be designed in various ways and may be connected and mounted in various ways. The apparatus may for example be adapted for two separate phases of electricity instead of three, whereby only one barrier panel may be necessary. The apparatus may for example be provided without an outer panel. When three separate phases of electricity are present, the apparatus may comprise only one barrier panel between two of the phases.

What is claimed is:
1. An apparatus for electric power distribution, comprising an enclosure having an access opening and defining an interior space (106),
at least two electrical components for separate phases of electricity within the apparatus, the two components being located within the enclosure and being spaced laterally from one another, at least one barrier panel formed of an electrically insulating material, the barrier panel being movable in relation to the enclosure between at least two positions, and guiding means for guiding the barrier panel between the at least two positions, the guiding means being adapted to guide the barrier panel to a working position in which the barrier panel is located within the enclosure and between the components and is adapted to provide a barrier between the components, characterized in that the guiding means are adapted to guide the barrier panel to an access position in which the barrier panel is located within the enclosure and displaced from the components in relation to the working position of the barrier panel, and in that the barrier panel is adapted to provide access to the at least two components when the barrier panel is positioned in the access position.

2. The apparatus according to claim 1, characterized in that the guiding means are adapted to provide a gap between the components when the barrier panel is positioned in the access position, and in that the guiding means are adapted to position the barrier panel outside the gap when the barrier panel is positioned the access position.

3. The apparatus according to claim 1, characterized in that the apparatus comprises at least two barrier panels, in that each barrier panel is movable in relation to the at least one other barrier panel, and in that the guiding means are adapted to guide each barrier panel in relation to the at least one other barrier panel.

4. The apparatus according to claim 1, characterized in that the apparatus comprises an outer panel which is movable in relation to the enclosure between at least two positions, in that the outer panel is movable in a plane having all electrical components on one side and the access opening on the other side, in that the guiding means are adapted to guide the outer panel to a working position in which the outer panel is located within the enclosure and adapted to prevent access to all components, in that the guiding means are adapted to guide the outer panel to an access position in which the outer panel is located within the enclosure and displaced from the components in relation to the working position of the outer panel, and in that the outer panel is adapted to provide access to all components when the outer panel is positioned in the access position.

5. The apparatus according to claim 4, characterized in that the outer panel is movable in relation to the at least one barrier panel, and in that the guiding means are adapted to guide the outer panel in relation to the at least one barrier panel.

6. The apparatus according to claim 1, characterized in that the panel is slidable in relation to the enclosure between the working and access positions, and in that the guiding means are adapted to guide the sliding of the panel in a plane of sliding.

7. The apparatus according to claim 6, characterized in that the plane of sliding of the panel is substantially parallel to the plane of the access opening.

8. The apparatus according to claim 6, characterized in that the extension of the panel in the direction of sliding of the panel is smaller than the extension of the access opening in the same direction.

9. The apparatus according to claim 6, characterized in that the apparatus comprises support means adapted to support the enclosure on a resting surface on which the support means are adapted to rest, and in that the plane of sliding of the panel is substantially transverse to the resting surface.

10. The apparatus according to claim 9, characterized in that the enclosure comprises at least two side walls opposite one another, the plane of each side wall being substantially transverse to the resting surface, in that each side wall has a lower portion adapted to be adjacent to the resting surface and an upper portion opposite the lower portion, and in that the guiding means are located in the region of the upper portion of the side walls and above the at least two electrical components.

11. The apparatus according to claim 1, characterized in that the panel is transparent.

12. The apparatus according to claim 1, characterized in that the panel is made of a polymer-containing material.

13. The apparatus according to claim 1, characterized in that the apparatus comprises locking means for locking the panel in the working position.

14. The apparatus according to claim 13, characterized in that the locking means comprise a first and a second locking means adapted to engage one another to lock the panel in the working position, in that the first locking means is affixed to the panel, and in that the panel is movable in relation to the second locking means.

15. A metering panel for medium and/or high voltage, the metering panel being connectable to an electric power distribution system, characterized in that the metering panel comprises an apparatus according to claim 1.

* * * * *